United States Patent Office 3,383,303
Patented May 14, 1968

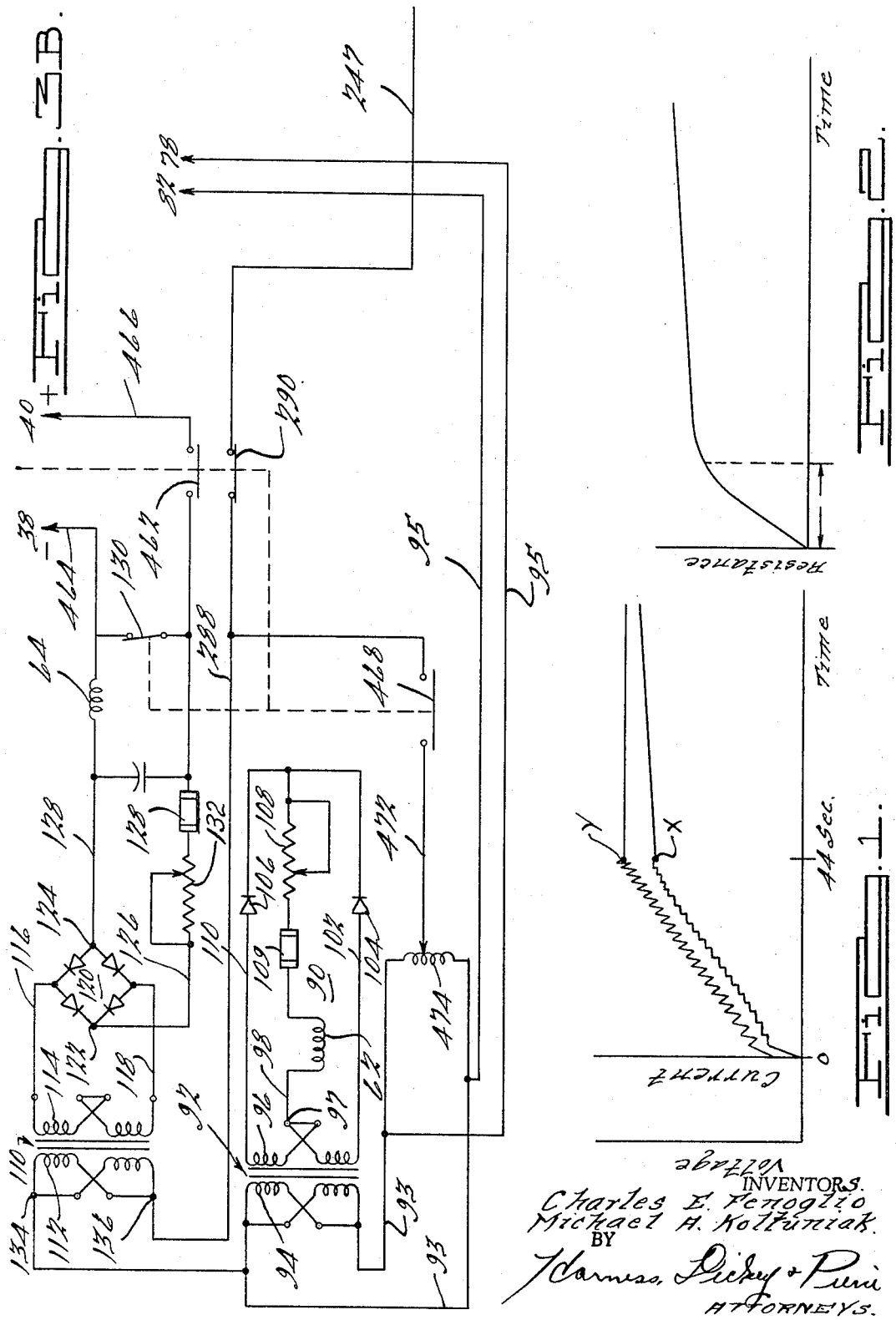

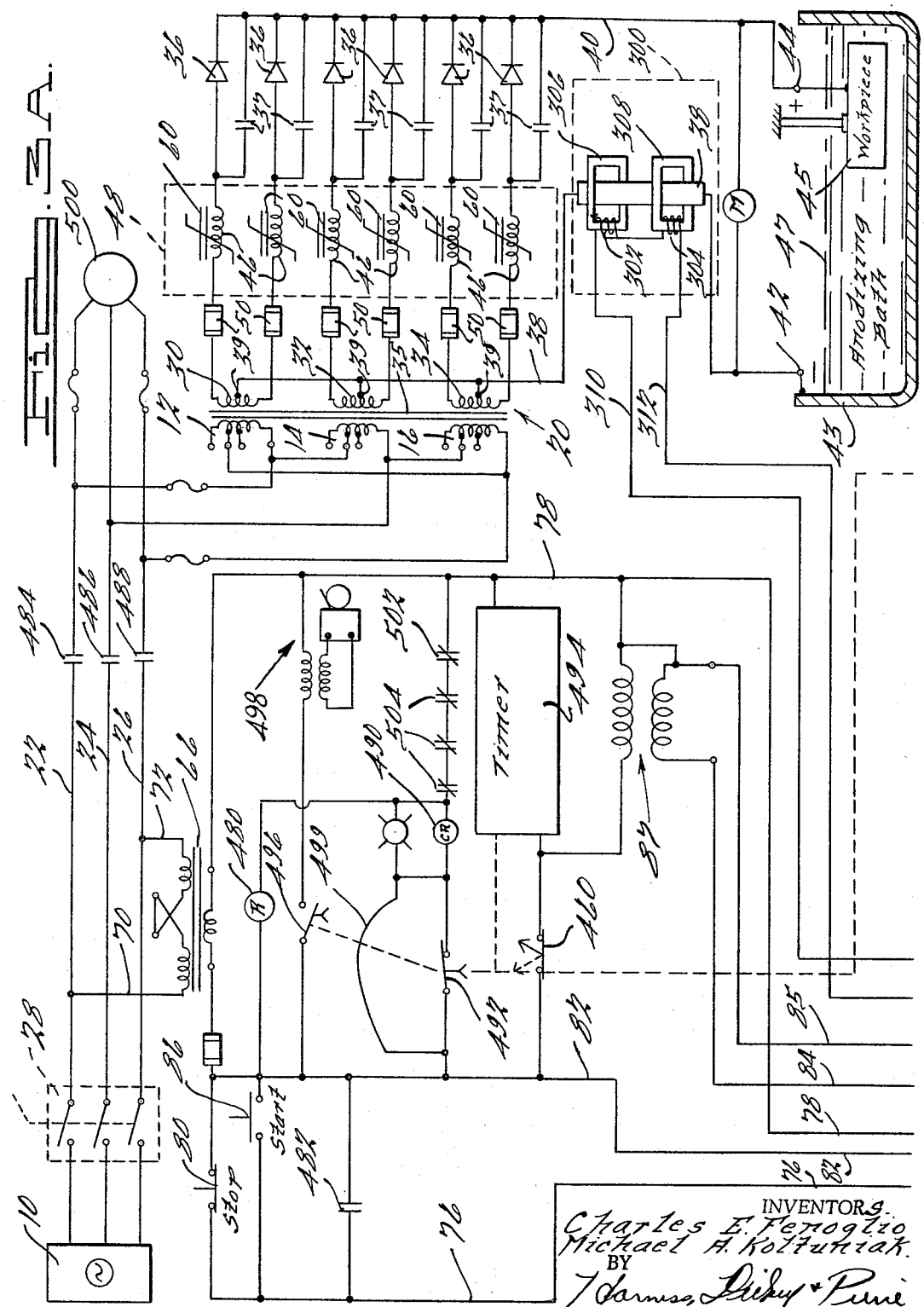

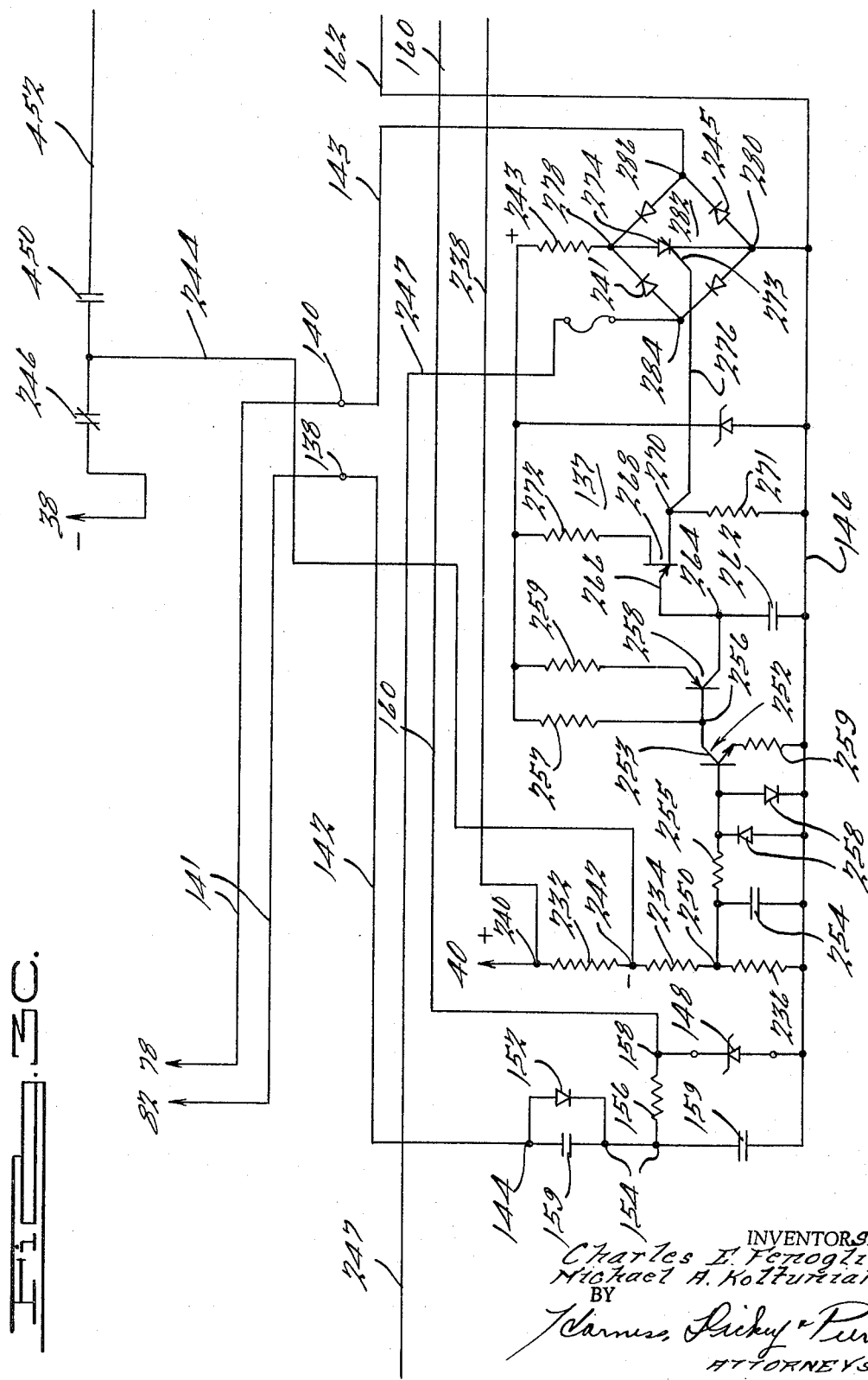

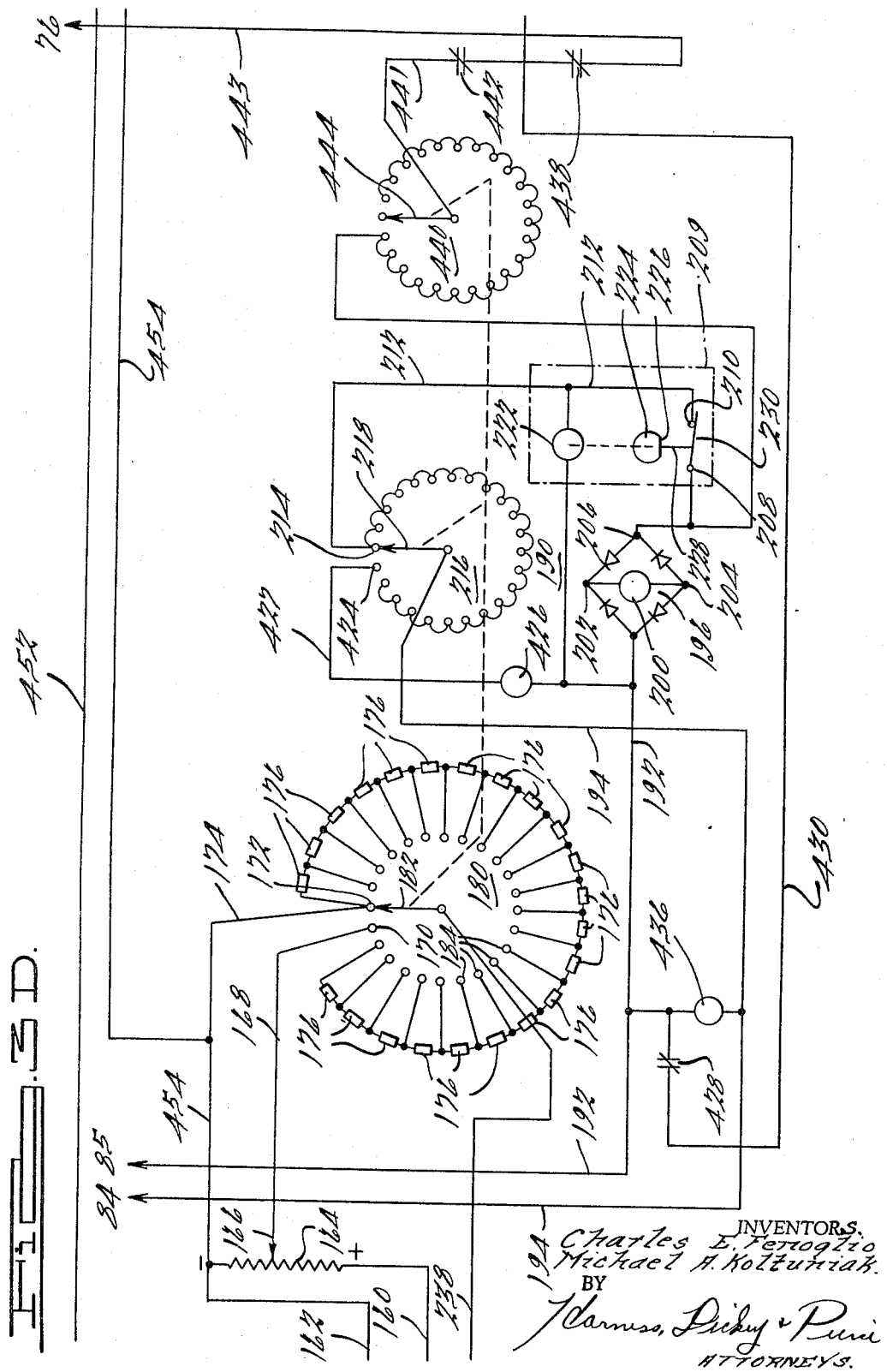

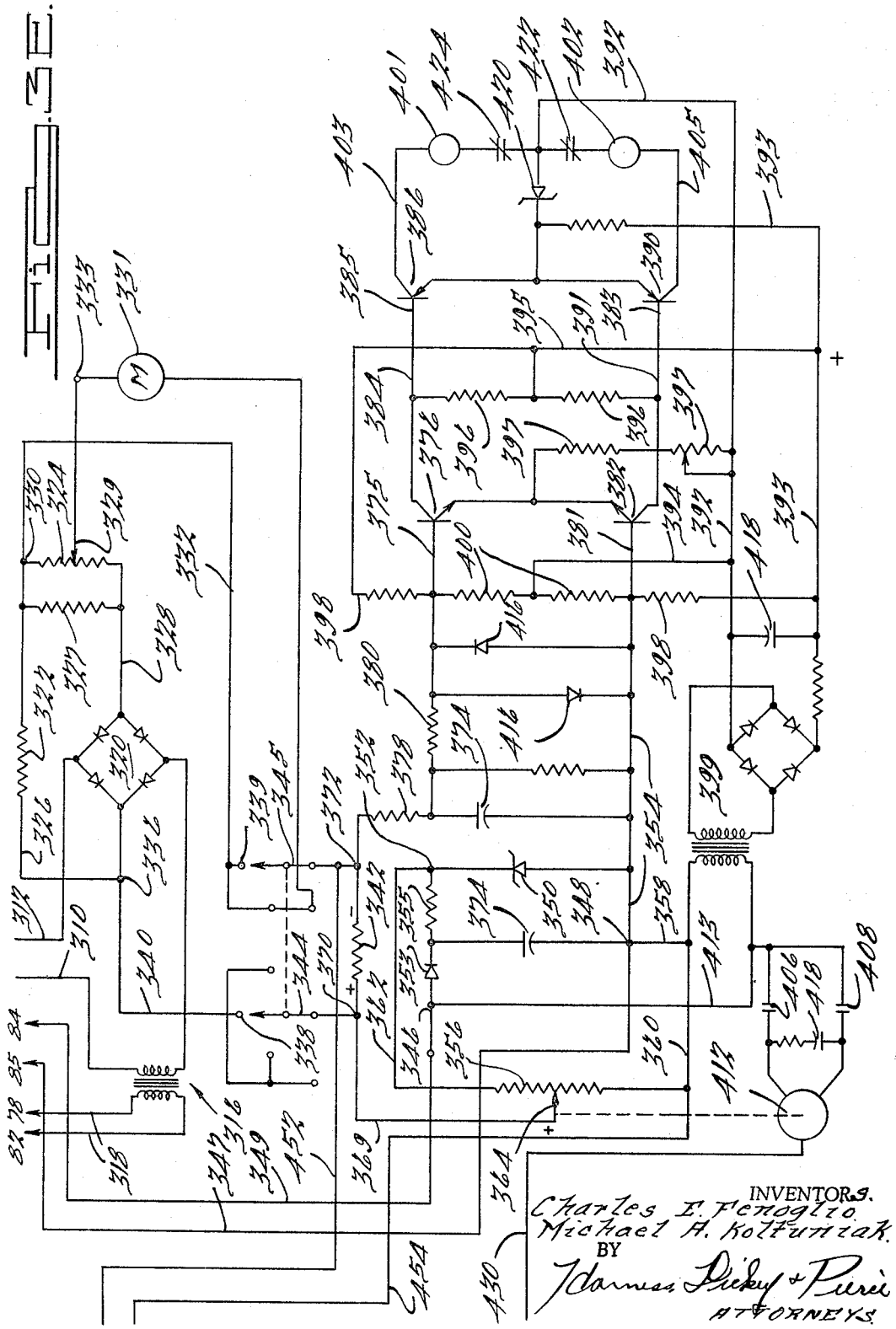

3,383,303
AUTOMATIC CONTROL PROGRAMMING FOR AN ELECTROLYTIC PROCESS
Charles E. Fenoglio, Detroit, and Michael A. Koltuniak, Warren, Mich., assignors to The Udylite Corporation, Warren, Mich., a corporation of Michigan
Filed Mar. 25, 1964, Ser. No. 354,568
24 Claims. (Cl. 204—228)

ABSTRACT OF THE DISCLOSURE

An automatic control system for an anodizing process which includes the features of automatically and incrementally increasing the electrical energy supplied to the anodizing bath as a function of time and subsequently supplying the anodizing bath with a constant current.

---

Background and summary of the invention

This invention relates generally to an automatic programming system for the control of electrical energy to a load, and more specifically to a system for program control of voltage and current supplied to an electrolytic bath.

In certain situations, it is desired that a load be supplied with electrical energy from a power source that is programmed to produce an increase in operating voltage from zero or a relatively low level to a higher level corresponding to the vicinity of the operating level in a specified length of time. Often this situation exists where the load resistance is variable and increases from a very low value to a substantially constant value as energy is passed therethrough. On attaining this general operating voltage, it is desired that a constant current situation be maintained due to certain characteristics of the load and the output voltage is allowed to vary to maintain this constant current. One such situation is in processes involving an electrolytic bath.

In certain types of electrolytic processes the work is placed in a large tank of a solution or bath and a source of electrical energy is connected thereto by connecting one load lead, either positive or negative, to the work and the other lead either to the tank or to an electrode immersed in the bath. Electrical energy is then passed through the work and bath to either plate or deplate the work or perform some other function thereon.

Referring particularly to the process of anodizing, although it is to be understood that other processes may similarly be applicable, the workpiece is made anodic by a suitable connection to the positive terminal of the power supply and the tank is made the cathode by connection to the negative terminal. As electrical energy is supplied to the electrodes, a coating builds up on the workpiece, the thickness and surface texture of which is dependent upon the voltage across the work, the current density passed through the work and the duration of the passage of the current. Suitable modifying agents may be added to the bath to vary the characteristics of the desired finish.

As the anodizing process is commenced, it has been found that the electrical resistance of the path through the circuit including the work and bath is extremely low or substantially zero. As the process progresses the oxide coating builds up on the workpiece and the electrical resistance steadily increases due to the resistive characteristics of the coating to a point of a characteristic resistance where it finally levels off to a substantially flat curve, remaining at that level throughout the remainder of the process.

From the foregoing, it is seen that it will be impractical and undesirable to impress the full operating or anodizing voltage on the work before this level resistance stage is reached due to the abnormally high currents which would result. The effect of these high currents would be either to burn the work or to mar the final finish so that the work would have to be discarded. Thus, at the start of the cycle, an extremely low voltage should be impressed and the voltage gradually brought up to the operating voltage as the coating built up to the point of substantially level resistance.

As was stated above, in an anodizing process, the quality and type of finish which results is determined by the magnitude of voltage applied across the work, the current density through the work and the time in which the electrical energy is applied. In normal commercial practice these factors may be determined by experiment and cut-and-try methods or by prepared schedules to determine the particular schedule of these units which must be followed to achieve a particular finish on the work. All three are of importance in the determination of the final result and should be controlled to achieve the desired finish. In the past, in order to maintain the proper current density (amperes per square foot), it was usually the case to determine the area of the work being anodized in order to determine the total current necessary to maintain a specified current density. With the various sizes and shapes of work being processed, it is obvious that this determination may become a tedious and complex problem to solve.

However, it has been found that each particular alloy that has been processed exhibits a voltage characteristic that may be termed its anodizing voltage characteristic curve. For example, one chromic acid anodizing process has a programming schedule which requires 10 minutes to bring the voltage up from zero to 10 volts and then 18 minutes to bring the voltage up to 40 volts, which is held at this level for 22 minutes and then an additional programming to bring the voltage up to 50 volts for 15 minutes. In typical sulfuric acid anodizing processes, this complex programming is usually not necessary and the sulfuric process may be operated at a particular characteristic voltage for a specified length of time. Thus, the voltage need only be brought up to this anodizing voltage and then the process carried out.

This characteristic anodizing voltage is present between the work and the tank when the proper current density is achieved and the process has reached the stage where the resistance has substantially leveled off as described above. It is important to note that this voltage characteristic is independent of the area of the work and this area need not be calculated in order to determine the voltage characteristic. For example, the anodizing voltage of any particular alloy may be determined by processing a piece of the alloy having a known surface area to the desired finish and measuring the voltage at the level resistance point in the process.

The system of the present invention fully automates the control of the process described above and accomplishes this automation in a manner not heretofore known in the art. Generally, in a system of a preferred embodiment, the system comprises a source of electrical energy including a three phase alternating current power supply which is rectified to obtain a direct current output, the control of which is accomplished by a means for varying the voltage and/or current including a set of saturable reactors having bias windings and control windings. In the initial stage of the process, or for approximately the first 50 seconds, the current in the control winding of the saturable reactor is stepped up in 22 increments, each lasting approximately 2 seconds, from an extremely low voltage to the predetermined anodizing voltage for the particular alloy of the workpiece. It is to be understood that any system of varying the voltage and/or current as a function of time, for example steps may be used for any duration of time, the only factor being that the time in which the final anodizing voltage is reached be at least as great as or longer than the time required for the workpiece to build up a sufficient coating that the resistance thereof has reached the substantially constant level.

In a preferred embodiment of the present invention, this stepping process is accomplished by establishing a reference voltage on a rotary stepping potentiometer and comparing this reference to the sensed output voltage. The output voltage is then controlled to meet this reference until the next voltage step is made and the output voltage is then brought up to the new level established. During this voltage stepping process, the current flowing in the output leads is sensed by a transductor system current sensor, and a reference voltage is set up which is proportional to this current. On reaching the final voltage step the system is then switched to current control. The level of the final voltage step is set to correspond to the anodizing voltage for the particular alloy being processed and the output current is maintained at the level determined at the time of switching from voltage to current control. A system timer is also provided to time ou the operation and operates to shut the power supply off when the cycle is complete.

Accordingly, it is an object of the present invention to provide an improved programmed voltage and current control system to be used in an electrolytic process.

Still another object of the present invention is to provide a system whereby the voltage is stepped up in increments to a predetermined voltage.

A further object of the present invention is to provide a system whereby the voltage is stepped up to a predetermined level in increments and then the system is switched to current control and the current is controlled according to a predetermined level set.

A still further object of the present invention is to provide a system whereby the voltage is stepped up to a predetermined level in increments, the output current being sensed during this stepping process, and then the system is switched to current control to maintain the current at the level of current which was sensed at the time of switching.

Certain of the foregoing objects are accomplished by a preferred embodiment which contemplates providing an automatic programming control system for supplying electrical energy from a source to a circuit including a pair of electrodes in a bath of an electrolytic process which has a plurality of variable electrical characteristics. The system comprises a means for varying the voltage and current applied to the circuit as a function of time for a preselected period and means effective after said preselected period for applying a substantially constant current to the circuit.

Certain other objects of the present invention are accomplished by the preferred embodiment which contemplates providing an automatic programming control system for supplying electrical energy from a source to a circuit including a pair of electrodes in a bath of an electrolytic process having a plurality of variable electrical characteristics. The system comprises a first sensing means for generating a first signal as a function of one of the electrical characteristics of the circuit and a second sensing means for generating a seond signal as a function of another of the electrical characteristics of the circuit. Further, means is provided connected in circuit with the source of electrical energy and the electrodes and is adapted to have variable electrical characteristics and includes means operable to vary said electrical characteristics for controlling the electrical energy supplied to the circuit in response to the said first and second means alternatively during a first and second phase of the process respectively.

Other objects, features and advantages of the present invention will become apparent from the subsequent description and the appended claims, taken in conjunction with the accompanying drawings, in which:

FIGURE 1 is a diagram of a voltage and current curve of a particular electrolytic process with which the system of the present invention is used;

FIGURE 2 is a diagram of a resistance curve of a particular electrolytic process with which the system of the present invention is used;

FIGURE 3a is a schematic diagram of a portion of a preferred embodiment of a system incorporating certain principles of the present invention illustrating particularly the power supply and control reactor thereof;

FIGURE 3b is a schematic diagram of another portion of a preferred embodiment of a system incorporating certain principles of the present invention illustrating particularly preferred control and bias winding circuits;

FIGURE 3c is a schematic diagram of another portion of a preferred embodiment of a system incorporating certain principles of the present invention illustrating particularly a preferred reference and control amplifier circuit;

FIGURE 3d is a schematic diagram of another portion of a preferred embodiment of a system incorporating certain principles of the present invention illustrating particularly a preferred voltage stepping circuit; and FIGURE 3e is a schematic diagram of another portion of a preferred embodiment of a system incorporating certain principles of the present invention illustrating particularly a preferred current sensing and current reference circuit.

It is to be understood that the description of certain features of the invention will relate to a specific preferred embodiment illustrating the many and varied features thereof. However, it is contemplated that many modifications may be made to the disclosed system, such as varying the voltage reference signal as a function of time irrespective of whether that function is continuous, discontinuous, linear or involves higher order functions. Also, the current may be controlled in a similar manner as a specific function of some condition of the process including time, resistance, etc. Also, it is to be noted that the system to be described, which embodies the various principles of the present invention, contemplates controlling the voltage throughout the duration of each step, however, it is also contemplated that each reference level may be set and the voltage brought up to the new level without voltage control throughout the duration of the step. This situation may occur in instances where the duration of the incremental steps is short and the load conditions may not vary to a great extent in this incremental time period.

Referring now to the drawings, and particularly to FIGURES 1 and 2, wherein is illustrated the voltage and current wave forms produced by the system of the instant invention and the resistance versus time curve of a typical anodizing bath. Referring to FIGURE 2, it is seen that the resistance of the load bath rises nearly linearly with time for a period after energization of the load of approximately 44 seconds and then tends to flatten out to a characteristic or constant resistance. This characteristic is due to the characteristic of an anodizing bath and the oxide coating being built up on the work, i.e., an extremely low resistance at the start and then increasing to a substantially constant value as the coating builds up. However, it is to be noted that the resistance at the flat portion of the curve does tend to rise slightly and is not exactly constant. Referring to the voltage versus time curve of FIGURE 1, point X designates the characteristic anodizing voltage for a hypothetical alloy that is being anodized as described above. These voltages normally are in the range of 18 to 40 volts and varies with the particular alloy being processed. As was stated above, the voltage is brolght up to the anodizing voltage gradually and the system of a preferred embodiment of the instant invention does so in 22 incremental steps, taking approximately 44 seconds to complete.

Thus, the stepped wave form which is generally increasing up to the anodizing voltage is shown between time zero and time 44 seconds. The current follows this voltage in a generally saw-toothed wave form until the anodizing voltage is reached. It is to be noted that each time the voltage is stepped up the current similarly increases. However, as the voltage step is maintained, the current tends to drop due to the increasing resistance of the load. In systems where this build-up of resistance is extremely slow or the resistance increases slowly, it may be only necessary to step the voltage up without any voltage control over the duration of each step. Also, a continuously increasing voltage rise may be used. During the voltage stepping stage the current is being continuously sensed and set on a reference element, the reference element serving as a reference signal during the latter portion of the cycle.

At the point where the voltage reaches the anodizing voltage, the system then switches to a current sensing operation wherein the reference element serves as described above. Current control is used for this portion of the cycle because of the slight increase in resistance described above. If the voltage were maintained constant then the current would have a tendency to decrease due to the slight increase of resistance of the load. Thus the system switches to current control to maintain the current density through the work at a constant value and from the point X on, it is noted that the voltage increases slightly to compensate for this rise in resistance. Referring to the current curve, it is seen where the current follows generally the same increase as the voltage described to the point wherein the current is sensed and controlled to maintain a constant value. Through a system of this type the current density through the work is maintained constant and this is an important consideration in many anodizing processes.

Referring now to FIGURES 3a to 3e, illustrating a schematic diagram of the system of the present invention, there is illustrated generally a system which has the capability of stepping the voltage from zero to the preselected anodizing voltage. During the stepping process, the current is also sensed and the resultant signal from this sensed current at the time of switching is used as a reference level in maintaining the current from that point to the end of the cycle at a constant value. From the above description it is seen that the current at the anodizing voltage is sensed at a point immediately prior to switchover thus giving a measure of the current density of the particular load being processed. In this way it is not necessary to calculate the area of the load being processed in order to maintain a constant current situation. It is to be noted that the system could be modified to eliminate current sensing during the voltage stepping process and merely sense the current immediately prior to the switchover to current control.

Referring particularly to FIGURE 3a, there is generally illustrated a circuit means for varying the voltage and/or current in response to control signals generated in the circuit of FIGURE 3c. In the circuit means an alternating current source of power 10 is supplied to primary windings 12, 14 and 16 of a main power transformer 20 by means of conductors 22, 24 and 26. A suitable on-off switch 28 has been provided in each of conductors 22, 24 and 26 to supply a ready total disconnect of the system for the user. A plurality of secondary windings 30, 32 and 34 of main power transformer 20 are inductively coupled to the primary windings 12, 14 and 16 by means of a magnetic core 35. The outer ends of the secondary windings 30, 32, 34 are connected to a bank of diodes 36 in the well-known full wave rectifier configuration. Suitable capacitors 37 have been provided in parallel with diodes 36 for filtering purposes as is well known in the art. The secondary windings 30, 32, 34 have been center tapped at 39 and provide the negative side of the output through conductor 38. The positive side of the output is provided by the parallel connection of the cathodes of diodes 36 to a main conductor 40. Thus a direct current output is provided at negative terminal 42 and positive terminal 44. A symbolic anodizing load is illustrated wherein the negative terminal 42 is connected to tank means in the form of an anodizing tank 43 and the positive terminal 44 is connected to a workpiece 45. A suitable anodizing bath 47, such as sulfuric acid or the like, is provided as is well known in the art.

The current in the secondary windings 30, 32, 34 of the power transformer 20 and thus the output voltage appearing at terminals 42, 44 is controlled by a control means and includes means for controlling the impedance of a plurality of power windings 46 of a saturable reactor bank 48. This control is accomplished by a control circuit means for the reactor bank 48 as will be hereinafter described. Suitable fuses 50 have been provided in the secondary circuit to assure that an overload condition does not persist and burn any elements in the secondray circuit. Primary windings 12, 14 and 16 of power transformer 20 are illustrated as being of the tapchanging type in order to provide additional control for the output circuit. Thus, the operating range of the direct current power supply may be varied to meet the demands of a particular load requirement.

Reactor 48 is of the saturable core type having a core 60 and bias windings 62 and control windings 64 inductively coupled thereto. Any of the known saturable reactors may be used wherein the saturation of the core 60 is controlled by flux produced therein by bias windings 62 to control the impedance of power windings 46. It is to be understood that each core 60 is provided with a control and bias winding and that only one set of windings have been illustrated in FIGURE 3b for the sake of simplicity. The cores 60 may be of the hypersil type or any similar core.

Power for the control 64 and bias 62 windings is supplied by an auxiliary transformer 66 which is suitably connected to one phase of the input source of lines 22, 26 by means of conductors 70 and 72. Typically, this auxiliary transformer lowers the input voltage from 440 volts to 110 volts. One source of control power is provided through conductors 76 and 78, controlled by a stop switch 80 to one stage of the control circuitry as will be hereinafter explained. A second source of 110 volt alternating current energy is available at conductors 82 and 78 for other portions of the control circuitry. A third source of control power is available between conductors 84 and 85 through means of an isolation transformer 87 to provide a source of electrical energy to the third group of control circuits.

Referring now to FIGURE 3b and the bias winding circuit 90, there is illustrated a transformer 92 having a primary winding 94 which is supplied by the power source from conductors 82 and 78 by means of conductors 93 and 95. A secondary winding 96 of transformer 92 is provided with a center tap 97 which is connected to one side of bias winding 62 through conductor 98. The ends of secondary winding 96 are connected through conductors 110 and 102 and a pair of diodes 104 and 106 to the other end of bias winding 62. Thus it is seen that the power to bias windings 62 is rectified and provides a direct current level of current to the winding 62. This current is limited by a variable current limiting resistor 108 and a fuse 109 has been provided as an overload protection.

Control winding 64 is similarly provided with an input transformer 110 having primary winding 112 and secondary winding 114. The secondary winding 114 is connected through conductors 116 and 118 to a full wave rectifier bridge 120 to provide a direct current output at terminals 122 and 124. This direct current output is fed to control winding 64 through conductors 126 and 128 and normally closed switch 130. A current limiter resistor 132 has been provided in conductor 126 for current limiting purposes and a fuse 128 is connected in series therewith for overload protection. The input to the control winding 64 circuit is provided at terminals 134 and 136 from a controlled source that will be hereinafter described.

Referring to a reference amplifier circuit in the form of a circuit means 137 as illustrated in FIGURE 3c, a suitable source of alternating current is supplied between terminals 138 and 140 from conductors 82 and 78 by means of conductors 141. This source of energy is impressed on terminal 144 and line 146 to the amplifier circuit 137 by means of a pair of conductors 142, 143. A reference voltage is established from this source of power across a Zener diode 148 connected in series therewith between terminal 144 and line 146 and the current through Zener diode 148 is half wave rectified by a diode 152 connected between terminals 144 and 154. Also a current limiting resistor 156 is connected in series between diodes 152 and Zener diode 148 through terminals 154 and 158 and suitable filter capacitors 159 are provided across diodes 148 and 152 as is known in the art.

The reference voltage across Zener diode 148 is fed through conductors 160 and 162 to a potentiometer 164 of a switching circuit means illustrated in FIGURE 3d for producing a signal which varies as a function of time of limited duration. A slider 166 selects a predetermined proportion of the voltage from potentiometer 164 and applies it through conductor 168 to a positive terminal 170 of a rotating stepping switch 180, a second terminal 172 thereof being connected through conductor 174 to the negative terminal of potentiometer 164. A plurality of series connected resistors 176, of which there are 22 in number, are connected between terminals 170 and 172 and thus dividing the preselected voltage impressed thereon by conductors 168 and 174 into 22 equal increments. It is to be noted that this preset voltage is so selected as to be the anodizing voltage referred to above of the particular alloy being processed and may be in the order of 18 to 40 volts.

The plurality of resistors 176 are arranged around the rotating stepping switch 180 which is provided with a sliding contactor 182 adapted to contact a plurality of contacts 184. Each of the contacts 184 are arranged in a circle and are connected to a point between each of the resistors 176. Thus, as the slider 182 progresses around the contacts 184 the voltage between the slider 182 and conductor 174 increases from zero to the maximum voltage selected from potentiometer 164 by slider 166 which is the anodizing voltage of the particular alloy being processed. The stepping switch 180 may be of the many types known to the art. For example, the switch 180 may be of the type having a wiper arm fastened to a disc fabricated of a suitable rigid material. The outer periphery of the disc is formed with teeth which are adapted to be engaged by a spring biased pawl connected to the armature of a relay coil. Thus, when the coil is periodically energized, the pawl engages the teeth and when the coil is de-energized it advances the contactor one position around the switch.

The stepping switch is actuated by a relay circuit 190, which may be of the type just described, energized by the alternating current energy available at isolating transformer 87, the energization being applied between conductors 192 and 194. Conductor 192 is connected to a full wave rectifier bridge 196 having a relay coil 200 connected therein between terminals 202 and 204. Terminal 206 of bridge 196 is connected to one terminal 208 of a timer switch 209, another terminal 210 being connected through conductor 212 to a contact 214 of a second rotating switch 216. The contactor 218 of the switch 216 is connected through conductor 194 to the other side of the source of electrical energy.

Connected between conductors 192 and 212 is a low speed motor 222 which is mechanically connected to a cam member 224 having a detent 226 thereon. The detent 226 is operable to open and close normally closed switch 230 through an actuator 228. The motor 222 is so constructed that it has a speed of thirty revolutions per minute, opening and closing switch 230 once every two seconds. The circuit through relay 200 from the source of energy is from conductor 192 through bridge 196, relay 200, terminal 206, switch 230, conductor 212, terminal 214, wiper 218, conductor 194 and back to the source of power. From the foregoing it is seen every time that motor 222 rotates, cam 224 is actuated, opening and closing switch 230. Every time switch 230 is opened the circuit through relay coil 200 is interrupted and the armature connected thereto is actuated. The armature of relay 200 is connected to the rotating wipers 182 and 218 of rotating switches 180 and 216 as described above. Accordingly, with each interruption of the coil 200, switch 180 steps one position around the contacts 184 and connects a new resistor 176 into the series of resistors to increase the voltage between line 174 and wiper 182.

The voltage between conductor 174 and wiper 182 is impressed across series resistors 232, 234 and 236 of amplifier 137 by means of conductor 238 and conductors 162 and 146. Thus, the sum of the voltages across each of the resistors 176 that has been connected in series by wiper 182 is fed across the series resistors 232, 234 and 236. The upper end of resistor 232 or terminal 240 is also connected to the positive output lead 40 of the direct current output and terminal 242 is connected to the negative output lead 38 through conductor 244 and normally closed switch 246.

Thus sensing means is provided for sensing an electrical characteristic of the bath, specifically the output voltage of the direct current power supply is fed across resistor 232 with terminal 240 being positive and terminal 242 being negative. Also, as to the reference voltage fed across terminal 240 and line 146, it is to be noted that terminal 240 is positive and line 146 is negative. The power supply for the reference amplifier is supplied by conductor 247 from the power supply connected to the upper end of primary winding 112 and the other terminal being provided from the power supply connected through conductor 142. Thus, the alternating current supply is rectified through a diode 241 and fed to a current limit resistor 243 and the current is returned through a diode 245. It is also to be noted that the current from Zener diode 148 also flows through diode 245.

Referring back to the signal from switch 180, as an example, if 22 volts is set on potentiometer 164 and wiper 182 has stepped to the first contact 184, a 1 volt signal is impressed on series resistors 232, 234 and 236. The current flowing through resistor 236 will increase the voltage of terminal 250 which in turn is impressed on a signal means respective to the output voltage signal and the reference voltage signal from FIGURE 3d, and specifically to the base of transistor 252. A suitable filtering capacitor 254 and ressitor 255 has been provided and voltage limitnig diodes 258 prevent the voltage to the base of transistor 252 from exceeding a set safe value. The collector 253 of transistor 252 is connected to a circuit for controlling the characteristic of the reactor, the input to the circuit being to the base 255 of a normally nonconducting transistor 258 to control the conduction thereof. The conduction of transistor 252 lowers the voltage of point 256 by varying the current through resistor 257 thus turning transistor 258 on to allow current to flow through a resistor 259 through transistor 258 to charge capacitor 262. The charging of capacitor 262 increases the voltage at point 264 thus increasing the voltage on emitter 266 of unijunction transistor 268. The current of the emitter base circuit of unijunction 268 increases the voltage at terminal 270 due to this emitter base current flowing through resistor 271. A suitable current limiting resistor 272 has also been provided.

The voltage 270 is impressed on the gate electrode 273 of the silicon controlled rectifier 274 through conductor 276. Silicon controlled rectifier 274 is connected across terminals 278 and 280 of full wave rectifier bridge 282 and controls the current flowing through conductors 274 and 143. The input terminals 284 and 286 of the rectifier bridge 282 are connected through conductor 247 and conductor 288 through a normally closed switch 290, to terminal 136 of the primary side of input transformer 110. Terminal 286 is connected to the source of electrical energy through conductor 143 to terminal 140. Thus, the circuit through silicon controlled rectifier 274 from the primary winding 112 is from one side 82 of the power supply at terminal 134 by means of conductors 93, 95 through primary winding 112, terminal 136, conductors 288 and 247 through switch 290, terminal 284, diode 241, silicon controlled rectifier 274, diode 245, terminal 286, back to the other side 78 of the source of electrical energy through conductor 143.

In operation, wiper 182 of switch 180 is rotated to the second contact 184 thus feeding 1/22nd of the voltage of potentiometer 164 to leads 238 and 162. This voltage is impressed across resistors 232, 234 and 236, and applies a signal to point 250. Transistor 252 is caused to conduct, thereby lowering the voltage at point 256 and causing transistor 258 to conduct. The current through resistor 259 and transistor 258 charges capacitor 262 to fire unijunction transistor 268. The emitter base current of the unijunction transistor 268 flowing through resistor 271 raises the voltage at point 270, thus firing silicon control rectifier 274 at a certain angle of the wave depending on the charging of capacitor 262. The base voltage of transistor 252 being very low at the early stages, the firing angle of silicon control will be very small, thus causing little current to flow between terminals 284 and 286.

Therefore the current through primary winding 112 will be small as will the current through control winding 64 also be small and reactors 48 will maintain the output voltage at a very low level. This output voltage is fed back to terminals 240 and 242 and as the direct current output voltage raises the voltage across resistor 232 also rises. As the voltage across resistor 232 rises, the current through resistor 236 will decrease due to the voltage drop between terminal 240 and line 146 being offset by the rise in voltage across terminals 240 and 242. As the voltage at terminal 250 decresaes, the conduction of transistor 252 will also decrease thereby lowering the firing angle of silicon controlled rectifier 274. As the voltage between terminals 240 and 242 approaches the voltage between terminal 240 and 146, the silicon controlled rectifier will approach zero conduction. Thus, the first step in increasing the voltage has been accomplished and wiper 182 of rotary switch 180 steps to the next position and the process is repeated until all of the resistors 176 have been connected in series between wiper 182 and line 174.

As the above described operation is proceeding, the current is also being sensed through a current sensing means in the form of a transductor 300 which is connected in series in the negative direct current output line 38. As is well known, a transductor is a device that senses direct current and in effect acts as a direct current transformer. The output of a transductor is a voltage which varies in accordance with the current being sensed. Referring now to the transductor circuit, there is illustrated a pair of oppositely wound coils 302 and 304 which are magnetically coupled to a pair of saturable cores 306 and 308. The coils 302 and 304 are connected in series between conductors 310 and 312 to modulate the current flowing therebetween.

The energization of coils 302 and 304 is provided by means of transformer 316 which supplies a source of 110 volts alternating current power derived from conductors 318. Thus, a flux set up in cores 306 and 308 by the current flowing in conductors 310 and 312 and the direct current flowing in conductor 38. It is to be noted that coils 302 and 304 are oppositely wound, thus the flux due to the alternating current flowing therein opposes the direct current flux due to the current in the output conductor first in one core then the other.

More specifically, the direct current flowing in the conductor 38 sets up a unidirectional flux in both cores which is proportional to this current. When the alternating flux is induced in the cores 306, 308 which is supering flux is inducted in the cores 306, 308 which is superimposed on the unidirectional flux. At a given instant of time and in view of the fact that the coils 302, 304 are oppositely wound, the instantaneous flux produced in one core will aid the unidirectional flux and the instantaneous flux produced in the other core will oppose the unidirectional flux. In the former situation, both fluxes aiding, the core will be driven into saturation and in the latter situation, the fluxes opposing, the core will not be saturated and will act as a current transformer in establishing an ampere-turns balance between the conductor 38 ampere-turns and the coil ampere-turns. During the second half-cycle the cores will reverse and the first core above will not be saturated and establish the ampere-turns balance and the second core will saturate. The operation of the system depends on the ability of the cores to return ot the nonsaturated state, thus the alternating current must be of sufficient magnitude relative to the conductor 38 current.

The ampere-turns balance may be expressed as follows:

$$N_C I_C = N_L I_L$$

Where $N_C$ is the number of turns of each coil 302, 304 and $I_C$ is the current flowing therethrough, and $N_L$ is the number of turns (one) of the load conductor 38 and $I_L$ is the current flowing therethrough. With the value of $N_L$ being one the expression may be rewritten:

$$N_C I_C = I_L$$

Thus the ampere-turns of the coils 302, 304 is equal to the load current and directly related thereto and this load current is directly related to the coil current in view of the fact that the number of coil turns is constant.

The current flowing in conductors 310 and 312 is in the form of a sharply defined alternating square wave which is rectified by a full wave rectifier bridge 320 giving a substantially level direct current output from bridge 320. The output of bridge 320 is impressed across series resistors 322 and 324 by means of conductors 326 and 328. Resistor 327 is provided to limit the current in resistor 324, as by a shunt path thereacross. Resistor 324 is center tapped at 329 thus forming a potentiometer and the positive terminal 330 of potentiometer 324 is connected to one side of an ammeter 331 through conductor 332 and the negative terminal 333 is connected to the other side of ammeter 331. Potentiometer 324 is small in resistance as compared to resistance 322 and the ammeter 331 is accordingly calibrated. The voltage across resistor 322 is fed through terminals 330 and 336 to a pair of contacts 338 and 339 by means of a conductor 340 and the conductor 332. Thus a voltage at terminals 338 and 339 exist which varies with the current flowing in the output conductor 38. This voltage is impressed on resistor 342 through conductors 344 and 345.

Turning to the reference motor servo control circuit, as illustrated in FIGURE 3e, a suitable source of alternating current is connected to terminals 346 and 348 by means of conductors 347 and 349. Connected across terminals 346 and 348 is Zener diode 350 which establishes a reference voltage between terminal 352 and conductor 354. This reference voltage from Zener diode 350 is impressed on a potentiometer 356 by means of conductors 358 and 360 at the negative terminal and conductor 362 to the positive terminal. Potentiometer 356 is provided with a wiper contactor 364 which impresses the voltage from the potentiometer 356 through conductor 369 to terminal 370 connected to the positive end of resistor 342. Thus a differential voltage is applied between conductor 354 and terminal 372 by a circuit through terminal 348, line 358, line 360, potentiometer 356, wiper 364, conductor 369, terminal 370 and resistor 342. This differential voltage is equal to the algebraic sum of the negative to positive voltage of potentiometer 356 as compared to the positive to negative voltage impressed on resistor 342. Suitable filter capacitors 374 have been provided between conductor 354 and terminal 372 as is known in the art.

This differential voltage is applied to the base 375 of transistor 376 through current limit resistors 378 and 380 and to the base 381 of transistor 382 through conductor 354. Diodes 383 have been provided as described in FIGURE 3c for the purpose outlined in connection therewith. Transistors 376 and 382 operate as a differential amplifier as is well known in the art, that is, if the voltage impressed on the base of transistor 376 becomes more positive than the normal cutoff voltage the transistor 376 will conduct. Similarly, if the voltage impressed on transistor 382 becomes more positive than the normal cutoff point, that transistor will start to conduct. Normally, both transistors are nonconducting as the voltages applied to their bases is normally zero or balanced at the cutoff potential. The collector of transistor 376 is connected through conductor 384 to the base of a transistor 386 and the collector of transistor 382 is connected to the base of a transistor 390 through a conductor 391. The direct current power supply for the group of transistors just described is received from conductors 392, 393, which are connected to a rectified source of direct current 394 desived from transformer 399. Thus, the emitter-collector circuits for transistors 376 and 382 are energized through conductors 393, 395, through a plurality of current limit resistors 396 and 397, one of which is variable. The base emitter circuits are energized through conductor 395, a pair of current limit resistors 398 and current limit resistors 397. The base voltages are established through conductors 394 and 395 and resistors 400 and 398 acting as a voltage divider.

Connected in the emitter-collector circuit of transistor 386 is a relay coil 401 which is so calibrated to operate when the conduction of transistor 386 begins. Similiarly, a second relay coil 402 is connected in the emitter collector circuit of transistor 390 and is operated by its conduction. Relay coil 401 is mechanically connected to relay contactors 406 and relay coil 402 is mechanically connected to relay contactors 408 and both operate to close the normally open contactors 406, 408. Contactors 406 and 408 operate to make and break a circuit to provide electrical energy to a servo motor 412 to operate motor 412 either in one direction or the other, depending on which relay coil, 401 or 402, has been actuated by the differential amplifier circuit. One side of a source of electrical energy is provided for servo motor 412 through conductor 413 and 349. The other side will be described as the description proceeds. The shaft of servo motor 412 is mechanically connected to wiper 364 of potentiometer 356 and operates to move the wiper in one direction or the other dependent upon the direction of energization of servo motor 412.

In operation, the difference in voltage between resistors 342 and the pickoff voltage of potentiometer 356 is compared and impressed on the base circuits of transistor 376 and 382. If the two voltages balance then neither transistor will conduct. However, for example, if the potentiometer voltage should exceed the voltage across resistor 342, then a more positive voltage will be impressed on the base of transistor 376, thus operating relay coil 401. On the actuation of coil 401, relay contactors 406 will close and operate servo motor 412 to move the wiper 364 upwardly to decrease the voltage between conductor 360 and wiper 364. When the voltage at potentiometer 356 is equal to the voltage across resistor 342, the transistors 376, 382 will be rendered nonconductive to deenergize both relay coils and the potentiometer voltage will be set at the voltage indicative of the sensed current.

The differential amplifier base circuits have been provided with diodes 416 to limit the voltages applied to the base circuits, as described in connection with reference amplifier circuit 140, also suitable filter capacitors 418 have been provided to filter out any ripple frequency that may be present in the direct current signals. Zener diode 420 has been connected between conductors 392 and 393 to limit the voltage which may be applied to the emitter collector circuit of transistors 386 and 390. If the positive voltage of conductor 393 gets too high as compared to the negative voltage of conductor 392, the Zener diode will conduct in the reverse direction to limit this voltage by the shunt path.

As a safety feature, a normally closed set of contacts 422 has been provided in series circuit with the emitter collector circuit of transistor 390 and relay coil 402. The contacts 422 are mechanically connected to relay coil 401 and are opened when coil 401 is activated. Thus, the coil 402 is precluded from also being activated due to the open circuit across contacts 422 and will be unable to impress a double voltage on servo motor 412 as may occur if both sets of contacts 406, 408 were closed. A second set of contactors 424 have been provided in the circuit of transistors 386 and coil 401, which are similarly mechanically connected to relay coil 402 for a similar purpose.

Referring back to rotary switches 180 and 216, when the last contact has been engaged by wiper 182 and 216, the cycle is complete for both switches 180, 216. Switch 216 has been provided with a contact 424 which is not interconnected with the rest of the contacts and serves to open the circuit and deenergize motor 222, thus ceasing the rotation of cam member 224. When contact wiper 218 engages contact 424, a relay 426 is energized through conductor 427. Relay 426 is mechanically coupled to normally closed relay contacts 428 and serves to open these contacts, thus opening a line 430 which supplies the other side of a source of electrical energy to servo motor 412 through conductor 192. The opening of line 430 to servo motor 412 deenergizes the servo motor 412 and thus sets the last position of wiper 364 on potentiometer 356. It is to be noted that this setting of potentiometer 356 is indicative of the current flowing in the output leads a the instant of time that the anodizing voltage set on potentiometer 164 has been reached by stepping switch 180. This voltage on potentiometer 356 will be used as a reference in the current control stage of the cycle as will be hereinafter explained.

A relay coil 436 is connected across lines 192 and 194 to be operated from the source of power connected therebetween. The coil 436 serves to operate a set of contactors 438 connected in circuit with a third rotary stepping switch 440 by means of conductor 441 and normally closed contacts 442. The energy for this circuit is supplied at one terminal through conductor 443 and the other terminal from conductor 192 through bridge 196. The relay coil 200 disposed in bridge 196 is also connected to the set of contacts 442 which are actuated thereby and serves to step rotary switch 440 in synchronism with stepping switches 180 and 216. Thus, if the process is stopped at any point prior to its completion, that is, wiper 444 of stepping switch 440 is stopped at a point intermediate its ends, then the relay coil 436 will operate to open and close relay contacts 438, thus stepping switch 440 around to its null position. As is seen from the dotted lines connecting the three switches together, the switches are ganged and rotary switches 180 and 260 will follow the movement of wiper 444 to reset the switches in their initial starting position.

The situation at the instant of time to which the description has proceeded, that is, when switch 180 is stepped around to its final contact 170, is that the output voltage has been stepped up in 22 increments by means of control winding 64 to the anodizing voltage set on potentiometer 164. During this process the current has been sensed through transductor circuit 300 and fed to potentiometer 356 through the action of servo motor 412. On completion of the stepping operation, the action of the servo motor 412 has been stopped by means of relay contactors 428 opening the power supply thereto, thus setting the voltage on potentiometer 356 as indicated by the transductor 300. This current signal must now be switched to reference amplifier circuit 137 to provide a reference voltage indicative of the current flowing at the instant of time of switching. This reference voltage at potentiometer 356 is compared to the sensed current through transductor circuit 300 and the difference will be used to control amplifier circuit 137. This control signal will in turn control the firing of silicon controlled rectifier 274 to control the current through the control winding 64 in a manner similar to the voltage control described above.

In this regard, relay coil 426, forming a part of a means for discontinuing the voltage signal, is mechanically coupled to the set of normally closed contactors 246 and operates to open these contacts thereby opening the circuit between the negative output lead and terminal 242 of reference amplifier 140. The relay coil 426, also forming part of a means for impressing the current signal on the reference amplifier circuit 137, is also mechanically coupled to a set of normally open relay contactors 450 which are connected through a conductor 452 to sense the voltage at terminal 372 through conductor 346. Thus, with contactors 450 being closed, the voltage at terminal 372 is fed to terminal 242 on FIGURE 3c by means of conductors 452, contactors 450 and conductor 244. Also, the voltage at line 360 is fed to line 146 on FIGURE 3c by means of a conductor 454 and conductor 162. With this arrangement, the difference signal between the voltages across resistor 342 and potentiometer 356 is fed between terminal 242 and line 146 or across resistors 234 and 236. The circuit for this signal is from terminal 372 through line 452, relay contactors 450, line 244 to terminal 242 and from line 146 through line 162, line 454 to line 360. The voltage drop from terminal 372 to 370 is from minus to plus and the voltage from terminal 370 through wiper 364, to line 360, is from plus to minus. Thus it is seen that the difference voltage is being supplied to reference amplifier 137.

As the signal from terminals 336, 338 increases, the voltage drop across resistor 342 will increase thereby decreasing the difference between voltage drops across resistor 342 and potentiometer 356. The effect is to decrease the voltage at terminal 250 of reference amplifier 137 thereby decreasing the conduction of transistor 252, which is normally conducting during this stage of the operation. The net effect of this is to lower the firing angle of silicon controlled rectifier 274 to decrease the current flowing through control winding 64. Thus the voltage supplied by reactors 48 to output conductors 38, 40 is decreased to lower the current flowing therein to the level set by potentiometer 356. Thus the current is controlled through the remainder of the process rather than the voltage.

The above system has been provided with means for manually controlling the operation of the circuit and in this regard, particular attention is directed to FIGURE 3b. The main control section illustrated in FIGURE 3a has been provided with an automatic-manual switch 460 which serves to cut off the power supply to a major portion of the control circuitry. This switch 460 is ganged with and operates to open the normally closed switch 290 provided in the conductors 247 and 288, the effect of which is to open the line impressing the control signal on primary winding 112. Also ganged with switch 460 is normally closed switch 130 and normally open switch 462. When switch 460 is actuated to manual, switch 130 is opened thereby breaking the circuit between leads 126 and 128 and switch 462 is closed to impress the output voltage of the direct current output power supply across winding 64. Conductor 464 is connected to the negative output lead and conductor 466 is connected to the positive output lead. A further switch 468 is also ganged to the above described switches and serves to connect a source of alternating current energy to lead 288 which is connected to terminal 136. Thus the switch 468 is connected to a center tap 472 on a coil 474 which is fed by the alternating current energy available at conductors 95. Thus a supply voltage is impressed on terminal 136 from center tap 472 through switch 468 and lead 288, the other side of the coil 474 being connected to terminal 134 through conductor 93. This power supply is rectified by full wave rectifier bridge 120 and supplies a negative potential in terminal 122 and a positive potential at terminal 124. This last named voltage is in opposite polarity to that present between conductors 464 and 466 which sense the output voltage. Thus a difference voltage is impressed across control winding 64 of power reactors 48. Therefore, the current through control winding 64 is controlled by the rise and fall of the direct current output voltage.

Referring now to FIGURE 3a, there is illustrated certain safety features which will now be described. For example, start button 86 is operated which serves to supply voltage to relay coil 480. Coil 480 is mechanically connected to relay contacts 482 which serves to close these contacts to supply voltage to conductors 82, 78. Start button 86, coil 480 and relay contactors 482 are the well-known holding circuit. Main power conductors 22, 24 and 26 are provided with relay contactors 484, 486 and 488 which are normally opened and operated by a relay coil 490. Thus when the holding circuit is actuated current is supplied through a switch 492 to coil 490 to close the contacts in main power leads 22, 24, 26. A timer 494 is provided which times the complete cycle of the anodizing process and is mechanically connected and actuates a normally open switch 496. When switch 496 is closed, a bell circuit 498 is rung to warn the operator that the cycle is complete. Switch 496 is also ganged to switch 492 and serves to open normally closed switch 492 to de-energize relay coil 490. When coil 490 is deenergized the relay contacts 484, 486, and 488 are open to disconnect the power supply from the load. A fan motor 500 is provided to cool the power supply and is provided with a suitable thermal relay (not shown) which serves to operate relay contact 502 to open them when the motor fan becomes overloaded. Also, a plurality of other overload devices in the form of normally closed contacts 504 are provided as is known in the art.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An automatic programming control system for supplying electrical energy from a source to a circuit including a pair of electrodes in a bath of an electrolytic process having a plurality of variable electrical characteristics including a characteristic resistance achieved by at least a portion of the circuit after the electrical energy has been applied to the circuit for one period of time, the system comprising;

means for varying the voltage and current applied to the circuit as a function of time for a substantially preselected period, said preselected period being related to the one period of time so that said characteristic resistance is substantially achieved, means for sensing the current flowing in the circuit when said characteristic resistance is substantially achieved, and means
 effective after said preselected period including control means responsive to said current sensing means for applying a controlled current to the circuit which is a function of said sensed current.

2. The system of claim 1 wherein said means for varying the voltage and current is responsive to the circuit characteristic.

3. In an apparatus for an electrolytic anodizing process, the combination of;

an electrolytic bath tank means containing said bath a workpiece
 adapted to be anodized having the characteristic of presenting an electrical resistance which increases substantially linearly for a substantially predetermined length of time and is substantially constant for the remainder of the process, means
 including circuit means for supplying electrical energy to said tank means and said workpiece to make said tank means cathodic and said workpiece anodic, sensing means
 for generating a signal as a function of one of the electrical characteristics at said workpiece and said tank means, means
 responsive to said sensing means for varying the voltage and current applied to said circuit means as a function of time for a preselected period, said preselected period being related to the one period of time so that said characteristic resistance is substantially achieved, means for sensing the current flowing in the circuit when said characteristic resistance is substantially achieved, and means
 effective after said preselected period for applying a constant current to said circuit means, said constant current being a function of said sensed current.

4. An automatic programming control system for supplying electrical energy from a source to a circuit including a pair of electrodes in a bath of an electrolytic process having a plurality of variable electrical characteristics including a process characteristic by at least a portion of the circuit after the electrical energy has been applied to the circuit for one period of time, the system comprising;

means
 for producing a first signal which varies as a function of time limited in duration, said duration being related to the one period of time so that said process characteristic is substantially achieved, sensing means
 for sensing one of the plurality of characteristics of the circuit and producing a second signal which is a function thereof, first signal means
 responsive to said first and second signal including means for producing a third signal which is a function of said first and second signal, second signal means
 sensing another of the plurality of characteristics of the circuit at a time just prior to said limit of said time function and when said process characteristic is substantially achieved and producing a fourth signal after said limit which is a function of said another characteristic sensed prior to said limit, control means
 connected in circuit with said source of electrical energy and the electrodes and adapted to have variable electrical characteristics including controlling means operable to vary said electrical characteristics in response to said third and fourth signals for controlling the electrical energy supplied to the circuit, means
 impressing said third signal on said controlling means for controlling the electrical characteristics of said control means, and means
 for discontinuing the effect of said third signal on said controlling means at said time limit including means for impressing said fourth signal on said controlling means after said limit.

5. An automatic programming control system for supplying controlled electrical energy from a source to a circuit including a pair of electrodes in a bath of an electrolytic process having a plurality of variable electrical characteristics, including a characteristic resistance achieved by at least a portion of the circuit after the electrical energy has been applied to the circuit for one period of time, and at least a first phase and a second phase, said system comprising;

first means
 for generating a first signal in accordance with the output voltage of the circuit and a reference signal during the first phase of the electrolytic process including means generating a signal as a function of time for providing said reference signal to said first means, said first phase being related in time to the one period of time so that said characteristic resistance is substantially achieved, second means
 for generating a second signal in accordance with the output current of the circuit and a reference signal during the second phase of the electrolytic process including signal means sensing said output current at the electrodes prior to the termination of the first phase and when said resistance characteristic is substantially achieved for providing said reference signal for said second means, and means
 connected in circuit with the source of energy and the electrodes and adapted to have variable electrical characteristics including controlling means operable to vary said electrical characteristics in response to said first and said second means for controlling the electrical energy supplied to the circuit and further including, means
 for connecting said first means to said controlling means during the first phase of the process and connecting said second means to said controlling means during the second phase of the process for controlling said output current during said second phase as a function of said second means reference signal.

6. An automatic programming control system for supplying electrical energy from a source to a circuit including a pair of electrodes in a bath of an electrolytic process having a plurality of variable electrical characteristics including a characteristic resistance achieved by at least a portion of the circuit after the electrical energy has been applied to the circuit for one period of time, the system comprising;

means for producing a first signal which varies as a function of time limited in duration, said duration being related in time to the one period of time so that said characteristic resistance is substantially achieved, sensing means
for sensing the output voltage of the circuit and producing a second signal which is a function thereof, first signal means
responsive to said first and second signal including means for producing a third signal which is a function of said first and second signal, second signal means
sensing the current at the electrodes at a time just prior to said limit of said time function and when said resistance characteristic is substantially achieved and producing a fourth signal after said limit which is a function of said current sensed prior to said limit, control means
connected in circuit with said source of electrical energy and the electrodes and adapted to have variable electrical characteristics including controlling means operable to vary the electrical characteristics in response to said third and fourth signals for controlling the electrical energy supplied to the circuit, means
impressing said third signal on said controlling means for controlling the electrical characteristics of said control means, and means
for discontinuing the effect of said third signal on said controlling means at said time limit including means for impressing said fourth signal on said controlling means after said limit.

7. An automatic programming control system for supplying electrical energy from a source to a circuit including a pair of electrodes in a bath of an electrolytic process having a plurality of variable electrical characteristics including characteristic resistance achieved by at least a portion of the circuit after the electrical energy has been applied to the circuit for one period of time, the system comprising;

means
for producing a first signal which varies as a function of time limited in duration, said function being of the form of incremental steps of predetermined duration sequentially increasing in magnitude, sensing means
for sensing the output voltage of the circuit and producing a second signal which is a function thereof, first signal means
responsive to said first and second signal including means for producing a third signal which is a function of the difference between said first and second signal, second signal means
sensing the current at the electrodes at a time just prior to said limit of said time function and when said resistance characteristic is substantially achieved and producing a fourth signal after said limit which is a function of said current sensed prior to said limit, control means
connected in circuit with said source of electrical energy and the electrodes and adapted to have variable electrical characteristics including controlling means operable to vary the electrical characteristics in response to said third and fourth signals for controlling the electrical energy supplied to the circuit, means
impressing said third signal on said controlling means for controlling the electrical characteristics of said control means, and means
for discontinuing the effect of said third signal on said controlling means at said time limit including means for impressing said fourth signal on said controlling means after said limit.

8. An automatic programming control system for supplying electrical energy from a source to a bath of an anodizing process having a characteristic resistance achieved by at least a portion of the circuit after the electrical energy has been applied to the circuit for one period of time, said system comprising;

means
forming an anode and a cathode supplied with electrical energy from the source, stepping means
having a fixed terminal and a movable terminal and selectively electrically energized for producing a first signal between said fixed and movable terminals which varies as a function of time limited in duration, said function being of the form of incremental steps of predetermined duration sequentially increasing in magnitude, sensing means
for sensing the output voltage at said anode and cathode including means for producing a second signal which is a function thereof, first signal means
responsive to the difference between said first and second signal for producing a third signal when said first signal exceeds said second signal, means
for producing a current reference signal, second signal means
inductively coupled to the electrical circuit for sensing the current between said anode and cathode at a time just prior to said limit of said time function and after said limit, and when said characteristics resistance is substantially achieved, servo means
responsive to said current reference signal and to said sensed current prior to and after said limit for producing a servo reference signal which is a function of the current at said anode and cathode prior to said limit, means
responsive to said servo reference signal and said second signal means after said limit for producing a fourth signal means after said limit for producing a fourth signal which is the difference between said servo reference signal and said limit, variable conductive means
selectively responsive to said third and fourth signals for producing a fifth signal which varies as a function of at least one of said third and fourth signals, control means
connected in circuit with the source of electrical energy and said anode and cathode having variable electrical characteristics including controlling means operable to vary said electrical characteristics in response to said fifth signal for controlling the electrical energy supplied to the circuit, and switch means
for connecting said third signal to said variable conductive means prior to said limit and connecting said fourth signal to said variable conductive means after said limit.

9. The system of claim 8 wherein the magnitude of said third signal is a function of the magnitude of the difference between said first and second signals.

10. In an apparatus for an electrolytic anodizing process, the combination of;
an electrolytic bath
tank means containing said bath
a workpiece
 adapted to be anodized having the characteristic of presenting an electrical resistance which increases substantially linearly for a predetermined length of time to a characteristic resistance and is substantially constant for the remainder of the process,
means
 including circuit means for supplying electrical energy to said tank means and said workpiece to make said tank means cathodic and said workpiece anodic,
stepping means
 having a fixed terminal and a movable terminal and selectively electrically energized for producing a first signal voltage between said fixed and movable terminals which varies as a function of time limited in duration, said function being of the form of incremental steps of predetermined duration sequentially increasing in magnitude,
sensing means
 for sensing the output voltage at said workpiece and said tank means including means for producing a second signal which is a function thereof,
first signal means
 responsive to the difference between said first and second signal for producing a third signal when said first signal exceeds said second signal, the magnitude of said third signal being a function of the magnitude of said difference between said first and second signals,
means
 for producing a current reference signal,
second signal means
 inductively coupled to the electrical circuit for sensing the current between said workpiece and said tank means both at a time just prior to said limit of said time function and after said limit and when said characteristic resistance is substantially achieved,
servo means
 responsive to said current reference signal and to said limit for producing a servo reference signal which is a function of the current at said workpiece and said tank means prior to said limit,
means
 responsive to said servo reference signal and said second signal means after said limit for producing a fourth signal which is the difference between said servo reference signal and said second signal means after said limit,
variable conductive means
 selectively responsive to said third and fourth signals for producing a fifth signal which varies as a function of at least one of said third and fourth signals,
control means
 connected in circuit with the source of electrical energy and said workpiece and said tank means having variable electrical characteristics including controlling means operable to vary said electrical characteristics in response to said fifth signal for controlling the electrical energy supplied to the circuit, and
switch means
 for connecting said third signal to said variable conductive means prior to said limit and connecting said fourth signal to said variable conductive means after said limit.

11. An automaitc programming control system for supplying electrical energy from a source to a circuit including a pair of electrodes in a bath of electrolytic process having a plurality of variable electrical characteristics including a characteristic which stabilizes after the electrical energy has been applied to the circuit for one period of time, the system comprising;
means
 for varying the voltage and current applied to the circuit as a function of time for a substantially preselected period limited in duration, said preselected period being at least as long as said one period of time,
first signal means
 sensing one of the conditions at the electrodes at a time just prior to said limit of said time function and producing a reference signal,
second signal means
 responsive to said reference signal and said conditions at the electrodes including means for producing a control signal after said limit which is a function of said conditions and said reference signal, and
control means
 connected in circuit with said source of electrical energy and the electrode and adapted to have variable electrical characteristics including controlling means operable to vary the electrical characteristics in response to said control signal for controlling the electrical energy applied to the circuit.

12. The system of claim 11 wherein said control means further includes means for connecting said first signals means to said controlling means prior to said time limit and connecting said second signal means to said controlling means after said time limit.

13. The system of claim 12 wherein said first signal means includes means for generating a signal as a function of time for providing a time reference signal to said first signal means.

14. The system of claim 12 wherein said one of the conditions at the electrodes is a current condition.

15. The system of claim 11 wherein said voltage and current varying means includes means for producing a first signal which varies as a function of time limited in duration, sensing means for sensing one of the plurality of characteristics of the circuit and producing a second signal which is a function thereof, first circuit means responsive to said first and second signal including means for producing a third signal which is a function of said first and second signal, means impressing said third signal on said controlling means for controlling the electrical characteristics of said control means, and means for discontinuing the effect of said third signal on said controlling means at said time limit including means for impressing said control signal on said controlling means after said limit.

16. The system of claim 15 wherein said first signal varies in sequentially increasing incremental steps of magnitude.

17. The system of claim 15 wherein said one of a plurality of characteristics sensed by said sensing means is a voltage characteristic of the circuit, and said one of the conditions at the electrodes is a current condition.

18. The system of claim 16 wherein said one of a plurality of characteristics sensed by said sensing means is a voltage characteristic of the circuit, and said one of the conditions at the electrodes is a current condition, said first signal means senses said current condition inductively.

19. The system of claim 11 wherein said one of the conditions at the electrodes is a current condition.

20. In an apparatus for an electrolytic anodizing process, the combination of;
an electrolytic bath
tank means containing said bath
a workpiece
adapted to be anodized having the characteristic of presenting an electrical resistance which increases substantially linearly to a characteristic resistance for a predetermined length of time and is substantially constant for the remainder of the process,
means
including circuit means for supplying electrical energy to said tank means and said workpiece to make said tank means cathodic and said workpiece anodic,
means
for producnig a first signal which varies as a function of time limited in duration corresponding to said predetermined length of time,
sensing means
for sensing one of the electrical characteristics of said workpiece and producing a second signal which is a function thereof,
first signal means
responsive to said first and second signal including means for producing a third signal which is a function of said first and second signal,
second signal means
sensing another characteristic of the workpiece at a time just prior to said limit of said time function and when said characteristic resistance is substantially achieved and producing a fourth signal after said limit which is a function of said another characteristic sensed prior to said limit,
control means
connected in circuit with said circuit means and said tank means and workpiece and adapted to have variable electrical characteristics including controlling means operable to vary the electrical characteristics in response to said third and fourth signals for controlling the electrical energy supplied to said circuit means,
means
impressing said third signal on said controlling means for controlling the electrical characteristics of said control means, and
means
for discontinuing the effect of said third signal on said controlling means at said time limit including means for impressing said fourth signal on said controlling means after said limit.

21. The system of claim 20 wherein said one characteristic is a voltage characteristic and said another characteristic is a current characteristic.

22. In an apparatus for an electrolytic anodizing process, the combination of
an electrolytic bath
tank means containing said bath
a workpiece
adapted to be anodized having the characteristic of presenting an electrical resistance which increases substantially linearly for a predetermined length of time and is substantially constant for the remainder of the process,
means
including circuit means for supplying electrical energy to said tank means and said workpiece to make said tank means cathodic and said workpiece anodic,
first means
for generating a first signal in accordance with the output voltage of said tank means and said workpiece during a first phase of the electrolytic process,
second means
for generating a second signal in accordance with the output current of said tank means and workpiece and a reference signal during a second phase of the electrolytic process including signal means sensing said output current at said tank means and workpiece prior to the termination of the first phase for providing said reference signal for said second means,
means
connected in circuit with said electrical energy supply means and said tank means and workpiece and adapted to have variable electrical characteristics including controlling means operable to vary said electrical characteristics in response to said first and said second means for controlling the electrical energy supplied to said circuit means and further including,
means
for connecting said first means to said controlling means during the first phase of the process and connecting said second means to said controlling means during the second phase of the process.

23. In an apparatus for an electrolytic anodizing process, the combination of;
an electrolytic bath
tank means containing said bath
a workpiece
adapted to be anodized having the characteristic of presenting an electrical resistance which increases substantially linearly to a characteristic resistance for a predetermined length of time and is substantially constant for the remainder of the process,
means
including circuit means for supplying electrical energy to said tank means and said workpiece to make said tank means cathodic and said workpiece anodic,
first means
for generating a first signal in accordance with the output voltage of said tank means and workpiece and a reference signal during a first phase of the electrolytic process including means generating a signal as a function of time for providing said reference signal to said first means,
second means
for generating a second signal in accordance with the output current of said tank means and workpiece and a reference signal during a second phase of the electrolytic process including signal means sensing said output current at said tank means and said workpiece prior to the termination of the first phase and when said characteristic resistance is substantially achieved for providing said reference signal for said second means, and
means
connected in circuit with said electrical energy means and said tank and workpiece and adapted to have variable electrical characteristics including controlling means operable to vary said electrical characteristics in response to said first and said second means for controlling the electrical energy supplied to said circuit means and further including,
means
for connecting said first means to said controlling means during the first phase of the process and connecting said second means to said controlling means during the second phase of the process.

24. The system of claim 23 wherein said means generating a signal included in said first means generates a signal which has a characteristic which varies as a function of time.

References Cited

UNITED STATES PATENTS

| | | | |
|---|---|---|---|
| 1,956,411 | 4/1934 | Bonine | 204—149 |
| 2,734,858 | 2/1956 | Bachman et al. | 204—211 |
| 2,918,421 | 12/1959 | Lundborg | 204—225 |
| 3,063,929 | 11/1962 | Phelan | 204—228 |
| 3,067,123 | 12/1962 | Huber | 204—231 |
| 3,121,054 | 2/1964 | Van Emden | 204—228 |
| 3,254,014 | 5/1966 | Daddona | 204—228 |

HOWARD S. WILLIAMS, *Primary Examiner.*

JOHN H. MACK, *Examiner.*

W. VAN SISE, *Assistant Examiner.*

UNITED STATES PATENT OFFICE
CERTIFICATE OF CORRECTION

Patent No. 3,383,303

May 14, 1968

Charles E. Fenoglio et al.

It is hereby certified that error appears in the above numbered patent requiring correction and that the said Letters Patent should read as corrected below.

Column 1, line 45, after "other" insert -- load --. Column 3, line 26, "ou" should read -- out --. Column 4, line 74, "brolght" should read -- brought --. Column 7, line 14, "to" should read -- of --. Column 8, line 59, "ressitor" should read -- resistor --; line 60, "limitnig" should read -- limiting --. Column 9, line 3, after "voltage" insert -- at --; line 7, "274" should read -- 247 --; line 49, "decresaes" should read -- decreases --. Column 10, line 12, after "alternating" insert -- current from transformer 316 is applied, and alternating --; line 13, cancel "ing flux is inducted in the cores 306, 308 which is super-"; line 29, "ot" should read -- to --. Column 11, line 37, "sived" should read -- rived --. Column 14, line 55, "contact" should read -- contacts --. Column 18, line 42, "characteristic should read -- characteristic --; line 52, cancel "means after said limit for producing a fourth signal"; line 54, after "said" insert -- second signal means after said --. Column 22, line 63, after "tank" insert -- means --.

Signed and sealed this 7th day of October 1969.

(SEAL)
Attest:

EDWARD M. FLETCHER, JR.
Attesting Officer

WILLIAM E. SCHUYLER, JR.
Commissioner of Patents